US007154095B2

(12) United States Patent
Luck et al.

(10) Patent No.: US 7,154,095 B2
(45) Date of Patent: Dec. 26, 2006

(54) SOLAR POWERED NARROW BAND RADIATION SENSING SYSTEM FOR DETECTING AND REPORTING FOREST FIRES

(75) Inventors: Jonathan M. Luck, El Cajon, CA (US); Stuart Waddell, El Cajon, CA (US); Howard Coven, El Cajon, CA (US)

(73) Assignee: Ambient Control Systems, Inc., El Cajon, CA (US)

( * ) Notice: Subject to any disclaimer, the term of this patent is extended or adjusted under 35 U.S.C. 154(b) by 248 days.

(21) Appl. No.: 10/492,155

(22) PCT Filed: Oct. 10, 2002

(86) PCT No.: PCT/US02/32242

§ 371 (c)(1),
(2), (4) Date: Apr. 9, 2004

(87) PCT Pub. No.: WO03/031924

PCT Pub. Date: Apr. 17, 2003

(65) Prior Publication Data

US 2004/0183021 A1 Sep. 23, 2004

Related U.S. Application Data

(60) Provisional application No. 60/328,436, filed on Oct. 10, 2001.

(51) Int. Cl.
*G01J 5/00* (2006.01)

(52) U.S. Cl. ...................................... 250/347; 250/348

(58) Field of Classification Search ................ 250/347, 250/348, 339.15, 342, DIG. 1
See application file for complete search history.

(56) References Cited

U.S. PATENT DOCUMENTS

| | | | |
|---|---|---|---|
| 4,455,487 | A | 6/1984 | Wendt |
| 4,471,221 | A | 9/1984 | Middleton et al. |
| 4,800,285 | A | 1/1989 | Akiba et al. |
| 4,982,176 | A | 1/1991 | Schwarz |
| 5,162,658 | A | 11/1992 | Turner et al. |
| 5,229,649 | A | 7/1993 | Nielsen et al. |
| 5,592,151 | A | 1/1997 | Rolih |
| 5,661,349 | A | 8/1997 | Luck |
| 5,726,451 | A | 3/1998 | Ishida et al. |
| 5,777,548 | A | 7/1998 | Murakami et al. |

FOREIGN PATENT DOCUMENTS

| | | | |
|---|---|---|---|
| DE | 199 54 259 A 1 | | 5/2001 |
| JP | 07015230 | A | 1/1995 |
| JP | 2000165128 | A | 6/2000 |
| JP | 2001267836 | A | 9/2001 |
| JP | 2001320224 | A | 11/2001 |

*Primary Examiner*—Constantine Hannaher
(74) *Attorney, Agent, or Firm*—Crowell & Moring LLP

(57) ABSTRACT

A radiation sensitive sensor (1) which detects electromagnetic radiation within a narrow band of the electromagnetic spectrum using a single, fixed infrared detector (12) to cover a 360° area in a plurality of segmented sectors obtained by rotation of a mirror (19) for each of the sectors with detection of the radiation from each sector providing an indication of the presence of a physical phenomena (50) such as a forest fire. The use of a single fixed detector and the mirror rotation allows for a solar powered unit which is able to be employed either singularly or in a system of grid locations to cover a wide sensor area in order to provide continuous operation and reliable alarm indications.

19 Claims, 4 Drawing Sheets

SOLAR POWERED NARROW BAND RADIATION SENSING SYSTEM FOR DETECTING AND REPORTING FOREST FIRES

This application claims the priority of U.S. Provisional Application 60/328,436, filed Oct. 10, 2001, the disclosure of which is expressly incorporated by reference herein.

BACKGROUND AND SUMMARY OF THE INVENTION

The present invention relates to the use of radiation sensitive sensors to detect physical phenomenon such as emergent forest fires.

The use of a solar power, microprocessor based sensor system is known from U.S. Pat. No. 5,229,649 which discloses a light energized energy management system used to powers an irrigation system. The system employs a photovoltaic module approximately 18 inches square which generates power from incident light stored and stores such power in supercapacitors. A transportable battery power source is connected to the controller to power communication for manual operation and for loading of irrigation control programs. At the end of each communication, upon removal of the transportable battery power source, the internal supercapacitor energy storage source is left fully charged. The controller remains in sleep mode consuming minimal energy. A real time clock, which is updated at brief milliseconds of sporadic time intervals for scheduled irrigation control, is the only energy used. Once a minute, the sytem comes out of sleep mode to check if watering activity is required. The power storage of the capacitors is approximately 6.5 mWH. The sporadically operated irrigation control uses less than 6.4 mWH per day with remaining energy expended by to 128 ultra-low-power valve activations per night from existing stored energy.

The methodology of energy management from full energy to zero energy and back to full energy at energy rates of change microwatts per minute is disclosed in U.S. Pat. No. 5,661,349. This controller provides a seamless accumulation of energy in order to smoothly progress from an inoperative unpowered condition to an operative powered condition. The device progresses to operability in spite of not only being totally devoid of received energy at various times but also being subject to a very slow accrual of energy over a period of days, weeks or months. A power monitor circuit is constructed from electrical circuit technology, which is operative at relatively low voltage levels, such as BICMOS technology. Other electrical devices are operative only at relatively high voltage levels and are typically made from CMOS technology. When power is marginal, the low-operational-voltage energy monitoring circuit reliably produces one or more status signals well before the other, higher-operational voltage circuits begin to operate. Therefore the electronic device of the '349 patent degrades and de-energizes smoothly. With respect to this particular application, the microprocessor based irrigation controller closes all controlled irrigation valves before reverting to housekeeping and minimal energy consumption during declining energy. Then, with further diminishing power, becomes dormant. Controller re-assumes full operability when energy balances permit.

It is an object of the present invention to provide a self-contained outdoor terrestrial vandal proof forest fire sensor for remote sensing and accurate reporting of incipient forest fires and to provide radio reporting alarms having reliable recognition of forest fire ignition events.

It is another object of the present invention to provide a grid array of control centers, which individually and collectively report to regional and/or national base stations. Communication occurs through radio repeater or satellite links and/or normal communication links such as telephone wires and/or internet links which are able to function with thousands of sensors. The sensor array allow for accurate reporting which covers hundreds of square miles of area in a timely manner to preclude spreading of the fire even under adverse dry and windy "fire season" conditions, thereby allowing employment of aircraft dropping retardant or fire jumpers. The sensors operate around the clock and each sensor allows for early detection while retaining accuracy to avoid an unacceptable rate of false alarms.

It is the further object of the present invention to provide that each fire sensor functions individually without involvement of remote computers or humans to detect the very earliest stages of forest fires and to be able to discriminate forest fires from other occurrences.

The detector system of the present invention uses a single solid state radiation sensor to detect radiation emission of a particular frequency known as the $CO_2$ spike which accompanies combustion of carbonaceous materials and particularly vegetation and trees in forest fires. According to the present invention, a single fixed radiation sensor receives radiation from a mirror that rotates through a series of angular positions in the horizontal plane of the earth.

The mirror covers an elevational angle of between +45 degrees and −45 degrees from the horizontal position in order to "look" at a vertical "slice" of terrain and sky.

According to a preferred embodiment, the incremental rotation of the mirror receiving infrared radiation through a sapphire window allows for the use of a single detector to sweep an entire 360° looking for a particular $CO_2$ spike exhibiting specific frequency variations in order to detect fire combustion.

It is a further object of the invention to provide signal processing of the output of the detector in order to control movement of the mirror as a function of the strength, duration and frequency of the signal.

Other objects, advantages and novel features of the present invention will become apparent from the following detailed description of the invention when considered in conjunction with the accompanying drawings.

DETAILED DESCRIPTION OF PREFERRED EMBODIMENTS

Figure 1:
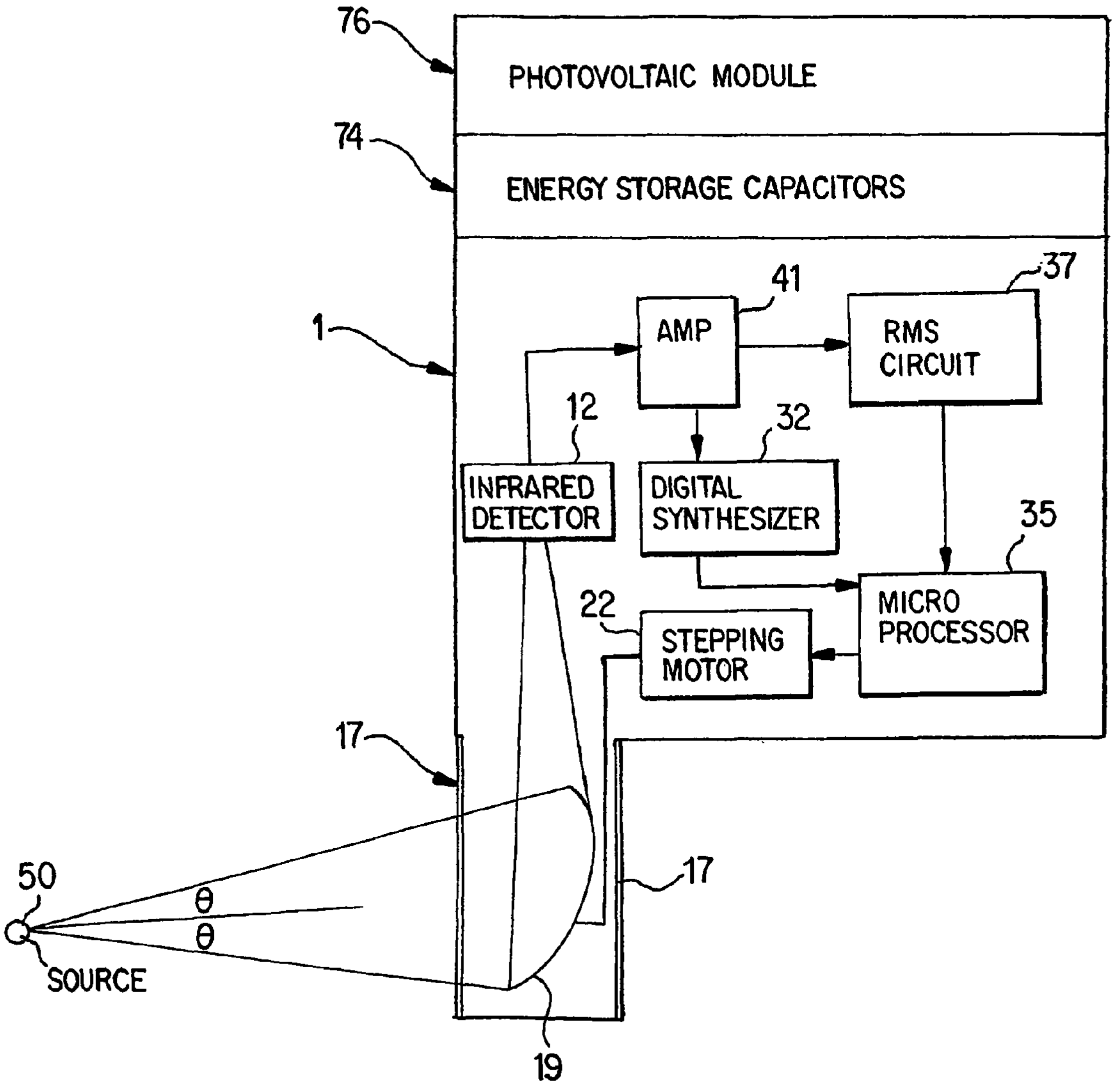
FIG. 1 is a function diagram of a sensor unit according to the present invention.

The sensor system 1 of FIG. 1 has a single infrared radiation (IR) detector 12 receiving radiation from source 50 passing through sapphire window 17 and reflected by rotatable mirror 19. The mirror 19 provides 360° rotation in increments of 6 degrees, for example, by control of the stepping motor 22. The vertical angle 2Θ has a magnitude determined by the sapphire window 17 and the vertical distance covered by the length of mirror 19. In a typical embodiment 2Θ covers approximately 90 degrees which, when sensor 1 is positioned in the forest environment, is typically +45 and −45 degrees from the horizontal.

For determining fire, radiation is detected in a narrow frequency band with a band pass centered at approximately 4.3 micrometers in the infrared (IR). The sensor system 1 provides this narrow band sensitivity by using a detector 12 having a silicon window covered with two separate optical coatings. Each coating has a separate but overlapping pass band. Additionally, there is a separate sapphire window which itself has a radiation pass band. The basis for detection of a fire is the emission of the $CO_2$ at 4.3 micrometers while normal atmospheric $CO_2$ is absorptive at this particular wavelength. Therefore, detection of a large signal at 4.3 micrometers is suggestive of a fire.

In order to distinguish spurious signals from 4.3 micrometer radiation of the type which may be due to sun reflection or radiation emissions from heated $CO_2$ not arising from an incipient forest fire, it is necessary to detect whether the 4.3 micrometer signal has a "flicker" frequency between 1 and 10 hertz which is uniquely indicative of fire. Additionally, a RMS (Root Mean Square) or similar signal strength analysis of the output of the detector 12 provides for an initial determination of whether a fire has been detected.

Still further discrimination is necessary to determine whether the fire is a forest fire or a campfire or a hiker mischievously holding a lit cigarette lighter in front of the radiation sensor. This further discrimination is necessary so as to eliminate chances of false alarms. This additional discrimination is based on a digital frequency analysis of the output of the IR detector. Both these methods of discrimination are taken into consideration during the scanning by the stepper motor 22 under the control of the microprocessor 35.

Figure 2:
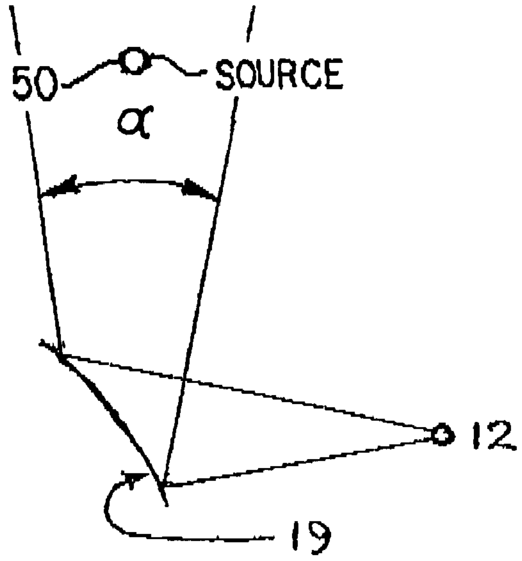
FIG. 2 is a sketch of a top view of FIG. 1 illustrating rotation in the horizontal plane.

Via the scanning mechanism, the sensor signals from detector 12 for each six degree increment are smoothed by averaging, creating a background baseline reference. As shown in FIG. 2, each step of the mirror covers an angle α in the horizontal direction. With each subsequent step, an additional six degrees is covered, until a full 360° circle is accomplished. During each step the output of detector 12 is amplified at 41 and then analyzed by microprocessor 35 after being processed by the root mean square circuit 37.

The microprocessor controls the analysis of the detection for each six degree segment so that the length of time for each six degree analysis is one second. However, actual detection only takes place after a "settling in" period. That is, every second contains an approximately 0.3 second segment during which the new position is "settled in" in order for the received infrared signal through the sapphire window to the detector to adjust to the particular level. Then RMS analysis occurs for the remaining approximately 0.7 seconds before moving to the next increment of six degrees so that for every one minute the entire 360° is swept. The RMS conditioner 37 provides this signal of the microprocessor 35.

If one of the segments provides an RMS indication of $CO_2$ at a predetermined level above the base line, the microprocessor flags this segment and subsequently examines the same segment for a similar RMS indication. If two occurrences exist in the same segment, digital frequency analysis is performed by the microprocessor for a longer period of time in order to provide further analysis. This further analysis is instrumental in determining if the detected event is a fire requiring the output of an alarm signal. The digital frequency converter 32 provides this signal to the microprocessor 35.

In the preferred form of the invention, the sensor assembly begins operation by stepping the mirror 19 through a sequential series of 6° steps with each step having a duration of one second and with each second being divided into a 260 millisecond segment during which time no detection occurs. This 260 millisecond time period allows for mechanical stability of the mirror at its new incremented position and also allows for balancing the received infrared signal and allowing it to reach its quiescent state. Subsequently, during the next 740 millisecond 20 sample signals are taking with each sample requiring 37 milliseconds. These output samples are fed through amplifier 41 to the RMS conditioner 37 under the control of the microprocessor 35. The amplifier 41 is a low frequency amplifier having a passband between approximately 1 and 10 Hz. These frequencies are uniquely associated with fire.

The RMS value of the sample is determined and is averaged with previous signals from other increments to provide a baseline RMS signal. If the RMS value of the signals obtained during the 740 millisecond of a particular segment exceed the "background RMS value" by a predetermined amount, a flag is attributed to the particular segment. For purposes of discussion, the segment under study will be considered as Segment X. After examining Segment X the stepping motor 22 is incremented to the next segment X plus 1 where the same sequence of detection occurs. The new signal values are added to the averaging process in order to update the background RMS. Once again, if the 20 sampler exceeds the "background RMS value" by the predetermined amount, a flag will set for the X+1 segment. In the first sweep through the 360°, each increment occupies one second regardless of whether a flag has been assigned to any segment. Once a full sweep has been completed, at the end of one minute, a second sweep begins and if the detected values at segment X on the second sweep once again provides a RMS value greater than the background RMS value by the predetermined amount, a second flag is assigned to position X. Once this second flag is assigned, the mirror remains fixed for a time beyond the one second in order to provide digital frequency analysis. In other words, the signals received from the detector 12 are subject to digital frequency processing by the digital frequency converter 32 and the microprocessor 35 for an extending period of time during which there is no incremented movement of the mirror from the position X. This period of time may extend up to three minutes in order to provide a detailed examination of the radiation entering at position X. If the results of the digital frequency analysis, caused by the system's reaction to the frequency of "flicker" of the fire, exceed a predefined criteria, an output alarm signal is sent from sensor system 1 by means of a radio or satellite modem to a central location. The microprocessor has an associated memory having a program with stored characteristics of forest fires which serves as the predefined criteria of flicker frequency analysis to be compared with the output of the Digital Frequency converter 32.

On the other hand, if the result of the digital frequency analysis is such that no incipient fire is indicated at that time, the second flag is removed and the mirror moves to the next segment position to once again employ the "one second" analysis at each segment. That is, the mirror will not stop and begin digital frequency analysis until the particular position has two flags associated with it. As a further example, if a position "X+1" has a detection of a signal which exceeds a background RMS value by the predetermined amount, it will also have a flag associated with it and on the next sweep, if the signal from "X+1" once again exceeds the RMS average by the predetermined amount, a second flag will be indicated for position X+1 and subsequently digital frequency analysis will be performed.

Scanning continues after digital frequency analysis or digital signal processing has been completed regardless of whether or not a fire is indicated at the particular position examined. This allows for analysis of the spread of the fire to different segments and enables detection of the direction in which the fire is spreading. The output signals from the sensor system are able to indicate the presence of a fire as well as provide, on a continuing basis, necessary information to the fire control base station 75 concerning the movement of the fire.

The output signal of the detector 12 is, as indicated above, digitized and interpreted by matching actual samples progressively received to historical and patterns for the evolution of real world forest fires. The present invention using a single detector 12 to sweep a 360° area in a continuous manner using narrow band optics, mechanical scanning, signal averaging and digital signal processing provides a system which is both reliable, inexpensive and easily adaptable to large areas.

Detector 12, in a preferred embodiment, is a pyro-electric detector of single element construction having a 4.4 micrometer pass band accomplished with two optical coatings on a silicon window. This detector is available from Hamamatsu Corporation as model number P3782-12. Power is supplied to storage supercapacitors 74 by Photo-voltaic module (PVM) 76, which may function, for example, in accordance with the energy management system of the above discussed U.S. Pat. No. 5,661,349.

Figure 4:
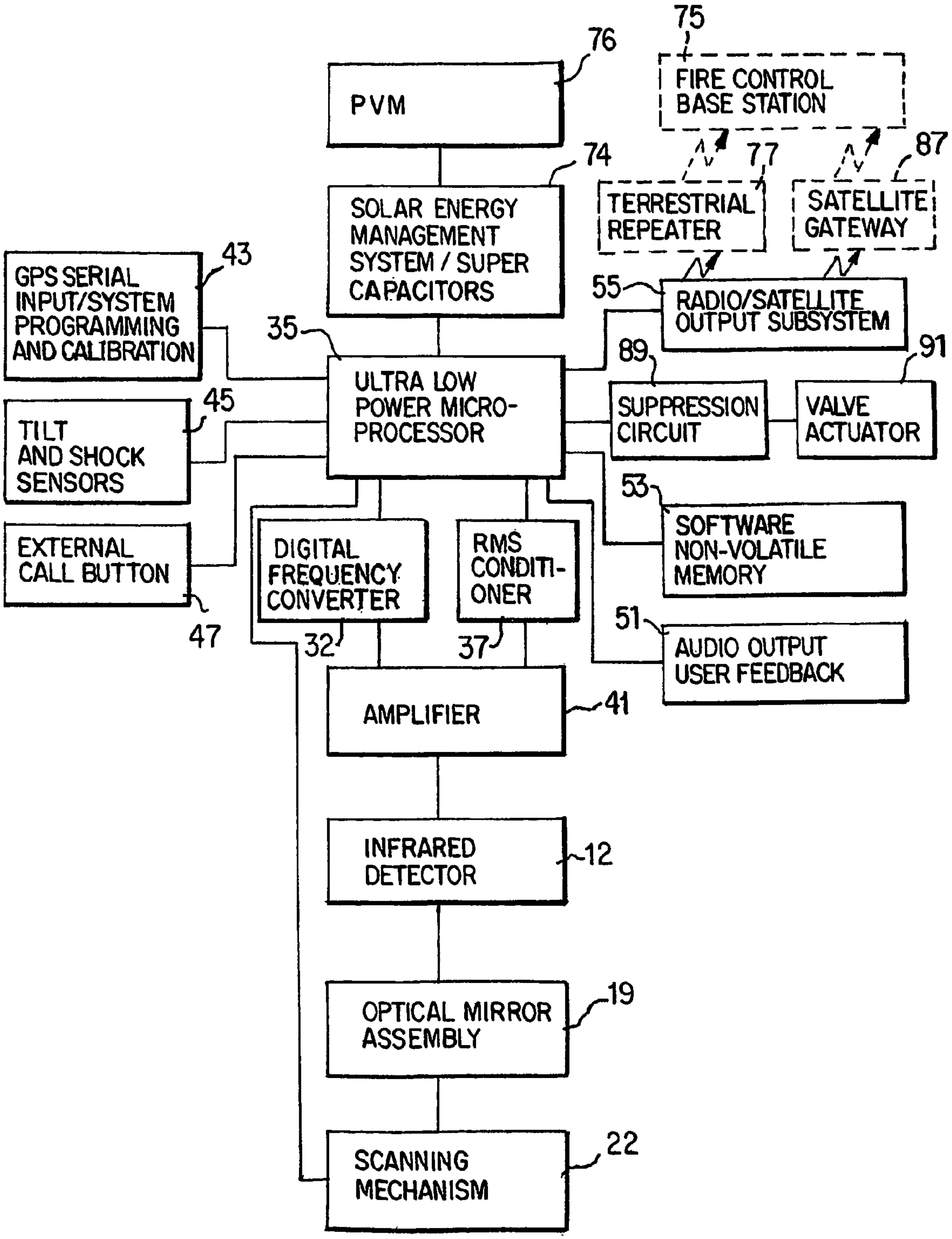
FIG. 4 is a block diagram functionally describing a preferred embodiment of the sensor according to the present invention.

The block diagram of FIG. 4 illustrates the various inputs, outputs and structural components of a system within the sensor system 1 of FIG. 1. In addition to the scanning mechanism 22, the infrared detector 12, the analog amplifier 41, the RMS conditioning circuit 37 and the digital frequency converting circuit 32, a solar energy management system 57 functions, for example, in accordance with the energy management system of the above-described U.S. Pat. No. 5,229,649. Output signals from the sensor system 1 are sent out through the radio/satellite modem output subsystem 55 to the fire control base station 75 terrestrially through a radio repeater 77 or by way of a Satellite to a Satellite Gateway 87.

The location of the sensor system 1 is determined based upon the GPS location information programmed into the system. In another variation, the sensor system 1 can include an external call button 47 which can be depressed by a human to cause a radio signal to be sent. The system would then serve as a "call box" for injured or lost hikers, woodsmen, and or others such as fireman in trouble who may have occasion to require aid or make other approved or prearranged signals to a central location. Additionally, the fire system sensor can be set up so that it is normally put into an alarm mode based on vandalism or tilt event. The tilt and shock sensors 45 provide the mechanisms for such an alarm system.

In addition to providing notification of forest fires, the system of the present invention is equally adaptable at providing indications of fires within confined or specific areas by an alarm actuation as well as actuation of a suppression system such as water sprinkler system, a gel system or a foam system. Because of the above described scanning function accomplished by the signal fixed element which continues to scan after an initial detection of fire, the system of the present invention is able to not only indicate the beginning of a fire, but also when a fire ceases to exist. This can be particularly useful with respect to a water sprinkler system which, in the prior art, continues to operate until a shut-off is manually performed, sometimes many hours after the fire has occurred. In most environments, when a fire occurs and a sprinkler system is set off, the major damage is due to water caused by the continuous sprinkler operation. Using the detector of the present invention, with its ability to continue scanning after the beginning of a fire, allows for not only the output of the signal to initiate the water sprinkler system, a foam system or a gel system but also to shut off the suppression system when the fire is extinguished.

The present invention allows for the control of a two-way valve to facilitate control of a sprinkler/foam/gel system. The control of the two way valve is affected through an electromechanically actuated latching solenoid that is controlled by signals from sensor system 1. The system may be wired directly to the sprinkler actuator or it may be set up for remote operation. It is also an advantage of the present invention that the sensor continues to scan even after a fire is extinguished so that, a sprinkler system, foam system or gel system can be reactivated if the fire reoccurs. Additionally, the ability to shut off the foam/gel system allows for saving foam/gel because such systems have a limited storage capacity.

In accordance with another aspect of the present invention, the detector can be easily modified to detect forms of radiation other then fire. For example, it may be used as heat sensors to detect body heat or any other physical phenomenon which emits a particularly signature infrared signal. This is an inexpensive and reliable system for continuous monitoring using minimal energy and a single detector to determine the presence or absence of a physical phenomenon in a 360° circle while the detector remains fixed. The detection and the signal analysis along with the sequence provides the ability to not only detect a physical phenomenon but to determine the movement of a physical phenomenon over time and the time when the physical phenomenon no longer exist.

The employment of multiple sensors constructed in accordance with the present invention allows for precise location of fires or other physical phenomenon as a grid constructed of multiple sensors. Using the location coordinates of the sensor systems, which are contained in the alarm date generated by each sensor system, the direction of the fire or physical phenomenon from each of the multiple sensors allows use of "triangulation" in order to pinpoint the exact location and direction of the fire based on signals from multiple sensor devices.

The reliability and continuous operation are ensured by the design of the PVM and the associated solar energy management system, utilizing supercapacitors. All power requirements are provided by an array of supercapacitor energy storage devices, which are sized accordingly to provide an extended period of power support with power being provided even in the absence of energy provided by the PVM. Upon the loss of solar or other ambient energy input to the sensor system, there is never a back-up battery or back-up energy source which switches into operation. This is a particularly important aspect of the present invention, as prior art systems often lose their back-up ability when electricity is cut-off during fires or other catastrophic events. The energy from the supercpacitors are the primary and only source of energy. As solar energy or other energy becomes available, the supercapacitors are charged up and maintain a full charge.

Figure 5:
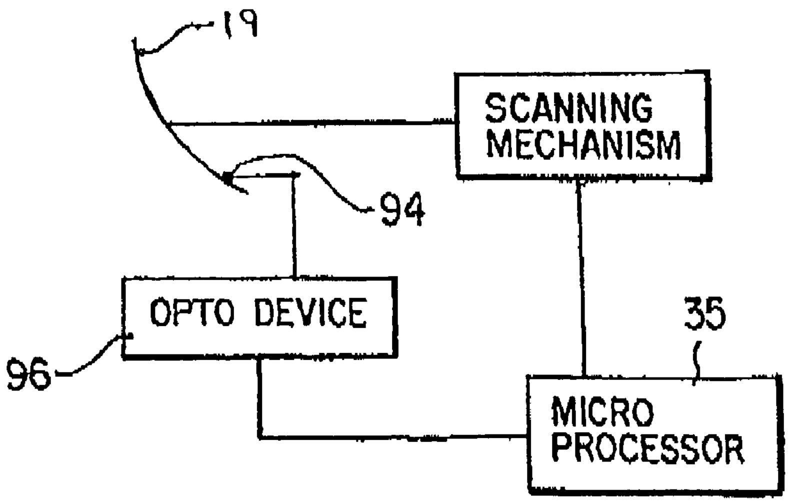
FIG. 5 schematically illustrates directional calibration of the sensor of FIGS. 1 and 3.
Figure 3:
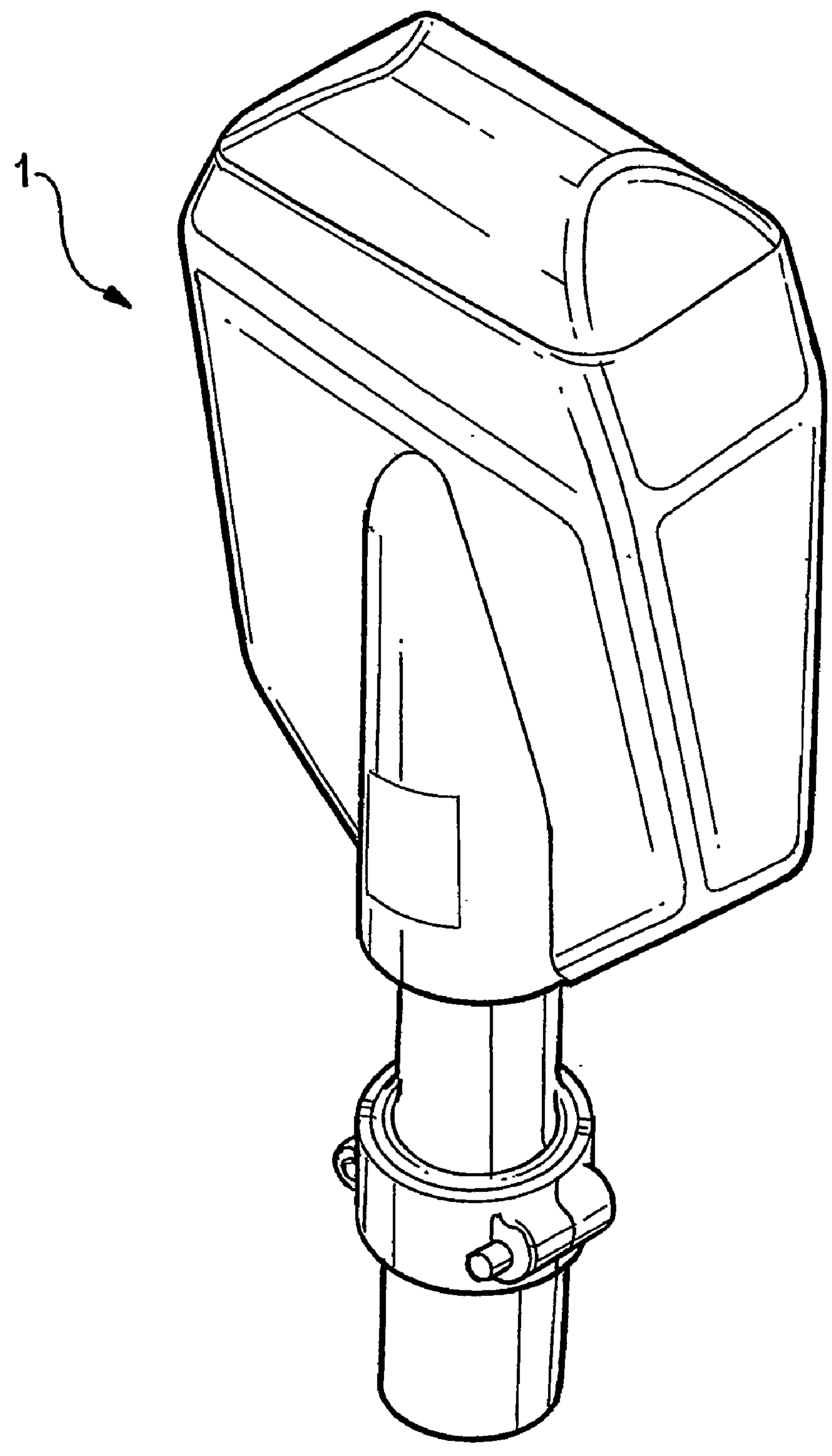
FIG. 3 shows the exterior of a unit constructed in accordance with FIG. 1.

Orientation calibration of the sensor of the present invention can be accomplished, for example, using the opto device 96 shown in FIG. 5 in association with the mirror 19. The opto device 96 include an optical sensor which directs light toward the spot 94 and receives the reflected light. This spot 94 may be made of gold or some other material providing precise reflection to the opto device. The Opto device 96 is used to calibrate the mirrors rotational position and provides such information to the microprocessor 35. Alignment to magnet north can now occur by rotating the mirror an additional number of steps until the mirror is pointing at magnetic North. This additional number of steps past the calibration point is stored by the microprocessor such that true fire bearing can be sent in an alarm situation. Other forms of self calibration with respect to North may be substituted.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A radiation sensitive sensor for detecting fire, said sensor comprising:

- a single fixed electromagnetic radiation detector sensitive to a narrow band of an electromagnetic radiation spectrum centered about a predetermined frequency of interest associated with fire;
- a rotatable infrared radiation directing device to receive infrared radiation from a first predefined angle in a first direction and from a second predefined angle in a second direction perpendicular to said first direction wherein said directing device is only rotatable in said second direction and wherein said directing device directs said radiation to said single fixed electromagnetic radiation detector;
- sector control device for sequentially rotating said directing device in said second direction in a series of increments provide stopping points at each of a plurality of sectors, each of said plurality of sectors receiving radiation from an angle in said second direction equal in value to said second predefined angle;
- output control device for controlling said sector control device and said radiation detector to provide a series of detected radiation output signals for each of said plurality of sectors and for controlling a duration between rotation from one of said plurality of sectors to an adjacent one of said plurality of sectors;
- a signal processing device for analyzing said series of detected radiation output signals output from said detector including a first short term signal analyzing device for measuring signal strength and a second longer term analyzing device for measuring signal information content after an indication of presence of fire is provided by said first short term signal analyzing device.

2. The radiation sensitive sensor according to claim 1, wherein said first signal analyzing device is a signal strength calculating device.

3. The radiation sensitive sensor according to claim 1, wherein said second analyzing device is a digital frequency analyzing device.

4. The radiation sensitive sensor according to claim 3, wherein said first short term signal analyzing device is a root mean square conditioning device.

5. The radiation sensitive sensor according to claim 1, further including an amplifier for providing a low-frequency passband for signals output from said detector.

6. The radiation sensitive sensor according to claim 5, wherein said amplifier provides a passband for signals between 1 and 10 hertz which are typically frequencies associated with a fire.

7. The radiation sensitive sensor according to claim 1, further including a suspension control device responsive to said indication of presence or absence of a fire to output either on or off signal to control opening and closing of a valve structure.

8. The radiation sensitive sensor of claim 1, wherein said sector control device is further to rotate said mirror after the detection of fire.

9. An infrared sensor system, comprising:

- a single fixed infrared radiation detector for detecting a narrow band of infrared radiation and outputting at least one detected signal;
- means for receiving infrared radiation over a fixed predetermined area, said area having a fixed predetermined angle of reception in a first direction and a second predetermined angle of reception in a second direction wherein said means for receiving the infrared radiation redirects the infrared radiation onto said single fixed infrared radiation detector;
- rotating means for rotating said means for receiving infrared radiation in said second direction through a series of incremental sectors providing a receiving angle in said first direction equal in value to said first predetermined angle and an angle sensing in said second direction equal in value to said second predetermined angle;
- control means for controlling said rotating means and for controlling an output of said detector;
- first analyzing means responsive to output signals from said detector in order to output a signal to said control means to modify operation of said rotating means;
- second analyzing means for analyzing signals output from said detector during said modification of said rotating means wherein an output of said second analyzer means provides an indication of the presence of received infrared radiation having informational qualities which exceed a background criteria by at least a predetermined amount.

10. The sensor system according to claim 9, wherein said first analyzing means compares values of output signals from said detector from one incremented segment with values of output signals from said detector from other ones of said incremented segments.

11. The system according to claim 9, wherein said means for receiving infrared radiation is a single mirror.

12. The sensor system according to claim 9, further including a fixed collecting structure surrounding said means for receiving infrared radiation, said structure comprising a material having a passband that encompasses closely said narrow band of infrared radiation.

13. The sensor system according to claim 9, wherein said narrow band of infrared radiation is associated with $CO_2$ emissions.

14. The sensor system according to claim 9, wherein the output of said second analyzing means is an alarm signal indicating the presence of fire.

15. The infrared sensor system of claim 9, wherein said control means is further to cause said rotating means to rotate said means for receiving infrared radiation after said output of the second analyzer means provides the indication of the presence of received infrared radiation having informational qualities exceeds the background criteria by at least the predetermined amount.

16. A radiation detection system comprising:

a radiation detector sensitive to radiation within a band of wavelengths centered about a predetermined wavelength that is associated with fire;

a rotatable mirror having a vertical coverage angle and a horizontal coverage angle to simultaneously receive radiation in both a vertical direction and a horizontal direction, said rotatable mirror configured to direct received radiation to said radiation detector;

a mirror control device coupled to said rotatable mirror and being configured to incrementally rotate said mirror horizontally through a plurality of sectors covering essentially 360 degrees.

17. The radiation detection system of claim 16, further comprising a controller coupled to said radiation detector and said mirror control device, said controller to, receive a plurality of output signals from said radiation detector, wherein said plurality of output signals are associated with each of said plurality of sectors, determine dynamically a background radiation value based on said plurality of output signals, determine if any of said plurality of output signals exceeds said background radiation value by more than a predetermined amount and, if so to provide a signal indicative of the presence of fire.

18. The radiation detection system of claim 16, further comprising a controller coupled to said radiation detector and said mirror control device, said controller to, provide an alert signal indicative of the presence of fire when said an output signal from said radiation detector exceeds a background radiation value by more than a predetermined amount, and cause said mirror control device to continue to incrementally rotate through said plurality of sectors after providing said alert signal.

19. The radiation detection system of claim 18, wherein said controller is further to provide movement information for said fire.

* * * * *